US012166164B2

(12) United States Patent
Choi et al.

(10) Patent No.: US 12,166,164 B2
(45) Date of Patent: Dec. 10, 2024

(54) METHOD OF MANUFACTURING A POUCH-TYPE SECONDARY BATTERY INCLUDING IRRADIATING AN INNER RESIN LAYER

(71) Applicant: LG Chem, Ltd., Seoul (KR)

(72) Inventors: Yong Su Choi, Daejeon (KR); Sang Hun Kim, Daejeon (KR); Hyung Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1025 days.

(21) Appl. No.: 17/050,163

(22) PCT Filed: Jul. 11, 2019

(86) PCT No.: PCT/KR2019/008568
§ 371 (c)(1),
(2) Date: Oct. 23, 2020

(87) PCT Pub. No.: WO2020/017826
PCT Pub. Date: Jan. 23, 2020

(65) Prior Publication Data
US 2021/0098815 A1    Apr. 1, 2021

(30) Foreign Application Priority Data

Jul. 20, 2018 (KR) ........................ 10-2018-0085049

(51) Int. Cl.
*H01M 10/04* (2006.01)
*B32B 15/08* (2006.01)
(Continued)

(52) U.S. Cl.
CPC ......... *H01M 10/0431* (2013.01); *B32B 15/08* (2013.01); *H01M 10/04* (2013.01);
(Continued)

(58) Field of Classification Search
CPC ............ H01M 10/0431; H01M 10/04; H01M 50/116; H01M 50/105; H01M 50/129; B32B 15/08
See application file for complete search history.

(56) References Cited

U.S. PATENT DOCUMENTS 6,503,656 B1    1/2003  Bannai et al.
2003/0031926 A1    2/2003  Farmer et al.
(Continued)

FOREIGN PATENT DOCUMENTS

CN    102569715 A    7/2012
EP    1063713 A2    12/2000
(Continued)

OTHER PUBLICATIONS

EPO machine generated English translation of JP 2001-319630 A (Year: 2001).*
(Continued)

*Primary Examiner* — Christopher P Domone
*Assistant Examiner* — Kimberly Wyluda
(74) *Attorney, Agent, or Firm* — Lerner David LLP

(57) ABSTRACT

A method of manufacturing a pouch-type secondary battery comprising the steps of: (a) preparing an electrode assembly having a separator interposed between a positive electrode and a negative electrode; (b) forming a receiving part for the electrode assembly in a case made of a laminate sheet; and (c) manufacturing a battery cell by receiving the electrode assembly in the receiving part and thermally fusing the case, wherein the laminate sheet comprises an outer resin layer, a metal barrier layer and an inner resin layer, the inner resin layer comprising polypropylene or polyethylene, and a crosslinking agent.

10 Claims, 4 Drawing Sheets

(51) Int. Cl.
*H01M 50/105* (2021.01)
*H01M 50/116* (2021.01)
*H01M 50/129* (2021.01)

(52) U.S. Cl.
CPC ....... *H01M 50/105* (2021.01); *H01M 50/116* (2021.01); *H01M 50/129* (2021.01)

(56) References Cited

U.S. PATENT DOCUMENTS

| | | | |
|---|---|---|---|
| 2006/0194103 A1* | 8/2006 | Otohata | H01M 50/124 429/185 |
| 2014/0377636 A1* | 12/2014 | Sung | H01M 50/133 429/163 |
| 2016/0141583 A1 | 5/2016 | Kim et al. | |
| 2018/0215884 A1 | 8/2018 | Takasugi | |

FOREIGN PATENT DOCUMENTS

| | | | |
|---|---|---|---|
| JP | H1186807 A | 3/1999 | |
| JP | 2001006633 A | 1/2001 | |
| JP | 2001319630 A | 11/2001 | |
| JP | 2002216718 A | 8/2002 | |
| JP | 2014195110 A * | 10/2014 | |
| JP | 2017031232 A | 2/2017 | |
| JP | 2017201580 A | 11/2017 | |
| KR | 20100099532 A | 9/2010 | |
| KR | 101036245 B1 | 5/2011 | |
| KR | 101143302 B1 | 5/2012 | |
| KR | 101179034 B1 | 9/2012 | |
| KR | 20140132528 A | 11/2014 | |
| KR | 20160040021 A | 4/2016 | |
| KR | 101629480 B1 | 6/2016 | |
| KR | 20160080559 A | 7/2016 | |
| WO | WO-2018186463 A1 * | 10/2018 | ............. B32B 27/32 |

OTHER PUBLICATIONS

EPO machine generated English translation of JP 2014-195110 A (Year: 2014).*
EPO machine generated English translation of WO-2018186463-A1 (Year: 2018).*
Extended European Search Report including Written Opinion for Application No. 19837484.5 dated Apr. 26, 2021, 8 pages.
Search Report dated Mar. 22, 2022 from the Office Action for Chinese Application No. 201980014906.X issued Mar. 30, 2022, pp. 1-3.
International Search Report for Application No. PCT/KR2019/008568, mailed Oct. 16, 2019, pp. 1-2.

* cited by examiner

METHOD OF MANUFACTURING A POUCH-TYPE SECONDARY BATTERY INCLUDING IRRADIATING AN INNER RESIN LAYER

This application is a national phase entry under 35 U.S.C. § 371 of International Application No. PCT/KR2019/008568, filed Jul. 11, 2019, which claims the benefit of priority to Korean Patent Application No. 10-2018-0085049 filed on Jul. 20, 2018, the disclosures of which are each hereby incorporated by reference herein in its entirety.

TECHNICAL FIELD

The present invention relates to a method of manufacturing a pouch-type secondary battery, in particular, a method of manufacturing pouch-type secondary battery comprising a thermoplastic resin and a compound having a sensitivity to an electron beam or radiation in an inner resin layer of a laminate sheet used as a case of the pouch-type secondary battery.

BACKGROUND ART

A lithium secondary battery may be classified into a cylindrical battery, a prismatic battery, and a pouch-type battery based on the appearance thereof, and may be classified into a lithium ion battery, a lithium ion polymer battery, a lithium polymer battery, based on the type of an electrolyte.

A recent trend in the miniaturization of mobile devices has increased the demand for a pouch-type battery, which is easy to modify the shape, low in the manufacturing cost, and lightweight.

FIG. 1 is a schematic exploded perspective view showing a general structure of a conventional typical pouch-type secondary battery.

Referring to FIG. 1, the pouch-type secondary battery 10 includes an electrode assembly 30, electrode tabs 40 and 50 extending from the electrode assembly 30, electrode leads 60 and 70 welded to the electrode tabs 40 and 50, and a case 20 accommodating the electrode assembly 30.

The electrode assembly 30 is a power generating element, in which a positive electrode and a negative electrode are sequentially stacked in a state where a separator is interposed between the positive electrode and the negative electrode, and has a stacked type or a stacked/folded type structure. The electrode tabs 40 and 50 extend from each pole plate of the electrode assembly 30. The electrode leads 60 and 70 are electrical connected, for example, by welding with a plurality of electrode tabs 40 and 50 extending from each pole plate and a part of the electrode leads 60 and 70 are exposed to the outside of the case 20. In addition, an insulating film 80 is attached to a part of the upper and lower surfaces of the electrode leads 60 and 70 in order to increase the sealing degree with the case 20 and to secure an electrical insulation state at the same time.

The case 20 is made of an aluminum laminate sheet, provides a space for accommodating the electrode assembly 30, and has a pouch shape as a whole. As for the case 20, an outer resin layer 21, which is made of nylon or polyethylene terephthalate material and is located in the outer side of a metal barrier layer 22 for preventing moisture penetration, and an inner resin layer 23, which is made of the polypropylene material configured to thermally fuse the case, are sequentially located.

However, in the case in which pressure and temperature are excessively set when the laminate sheet is thermally fused, the metal barrier layer may be exposed while the thickness of the inner resin layer becomes thin, thereby causing a problem of deteriorating the insulation property of the secondary battery.

In addition, when the battery is stored at a high temperature, the bonding of the thermally fused inner resin layer may be weakened, thereby causing a problem of venting.

In this regard, Patent Document 1 discloses technology to minimize cracking of a resin sealant layer of a laminate sheet and corrosion of a metal barrier layer by introducing an inorganic filler and/or an organic filler, having a glass transition temperature (Tg) of the organic filler equal to or higher than a melting temperature of a thermal fusion material, in the matrix of the thermal fusion material to the resin sealant layer of the laminate sheet.

Since the laminate sheet of Patent Document 1 includes the organic filler having a higher melting temperature than the melting temperature of the thermal fusion material, it is possible to increase the temperature at which a thermal fusion layer is melted. In addition, by including the inorganic filler, it is possible to absorb moisture in a battery and to prevent corrosion of the barrier layer from occurrence.

Patent Document 2 discloses a manufacturing method of a pouch-type battery including the process of applying an ultraviolet curing material to an end of a sealing part of the pouch-type battery and hardening thereof, and it is possible to improve the sealing property of the pouch-type battery by applying the ultraviolet curing material.

Patent Document 3 discloses a secondary battery in a state in which an electrode assembly is mounted, having a structure of preventing moisture from penetrating into a case or causing an electrolyte to vaporize to the outside by adding a sealant promoter to the inner side of a sealing part formed by thermal fusion of the mutually contacting portions of the outer circumferential surface of the case.

However, the secondary batteries of Patent Document 2 and Patent Document 3 do not suggest a solution to the problem of deteriorating the insulation property of the metal barrier layer due to the thermal fusion of the sealing part.

As described above, when a pouch-type secondary battery is used, there is an urgent necessity for a solution in which the insulation property of a metal barrier layer is not ensured as an adhesive part becomes thin due to thermal fusion of a sealing part and a method that is capable of preventing a sealing force of a pouch-type secondary battery from deteriorating.

RELATED ART DOCUMENT

Korean Registered Patent No. 1143302
Korean Registered Patent No. 1036245
Korean Registered Patent No. 1179034

DISCLOSURE

Technical Problem

The present invention has been made in view of the above problems, and it is an object of the present invention to provide a method of manufacturing a pouch-type secondary battery which prevents the insulation of a sealing part from deteriorating during thermal fusion of the pouch-type secondary battery and improves a sealing property.

Technical Solution

According to an embodiment, a method of manufacturing a pouch-type secondary battery comprises: (a) preparing an electrode assembly having a separator interposed between a positive electrode and a negative electrode; (b) forming a receiving part for the electrode assembly in a case made of a laminate sheet; and (c) manufacturing a battery cell by receiving the electrode assembly in the receiving part and thermally fusing the case, wherein the laminate sheet comprises an outer resin layer, a metal barrier layer and an inner resin layer, the inner resin layer comprising polypropylene or polyethylene, and a crosslinking agent.

According to another embodiment, a method of manufacturing a pouch-type secondary battery comprises: (a) preparing an electrode assembly having a separator interposed between a positive electrode and a negative electrode; (b) forming a receiving part for the electrode assembly in a case made of a laminate sheet; and (c) manufacturing a battery cell by receiving the electrode assembly in the receiving part and thermally fusing the case, wherein the laminate sheet comprises an outer resin layer, a metal barrier layer, and an inner resin layer, the inner resin layer comprising a compound represented by the following Chemical Formula 1 or 2.

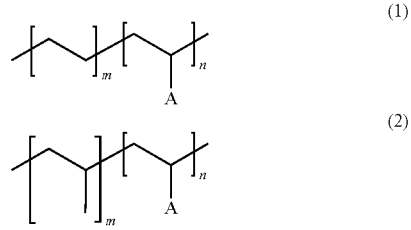

In the above formulas, m and n are integers of 1 to 10, and A is a maleic acid group, an acrylic acid group or a carboxylic acid group.

After the step (c), the method may further comprise a step (d) of irradiating an electron beam (E-beam) or radiation to the battery cell.

A sealing part may be provided in an inner resin layer of an upper case and a lower case forming the case by thermal fusion of the step (c), and a graft polymerization may be performed in the sealing part by irradiating the electron beam or radiation of the step (d).

The crosslinking agent may be at least one selected from a group consisting of trimethylolpropane triacrylate (TMPTA), triallyl isocyanurate (TAIL), and trimethallyl isocyanurate (TMAIC).

The irradiation of electron beam or radiation of the step (d) may be provided to the sealing part of the battery cell.

The irradiation of electron beam or radiation of the step (d) may be provided to the entire area of the battery cell.

The inner resin layer of the laminate sheet may be a monolayer structure comprising polypropylene or polyethylene, and a crosslinking agent, wherein the crosslinking agent is sensitive to the electron beam or radiation.

Alternatively, the inner resin layer of the laminate sheet may be a monolayer structure comprising a compound represented by Chemical Formula 1 or 2.

The electrode assembly may be at least one selected from a group consisting of a stacked type electrode assembly, a stacked/folded type electrode assembly, a laminated/stacked type electrode assembly, and a jelly-roll type electrode assembly.

In addition, the present invention provides a pouch-type secondary battery manufactured by the above manufacturing method.

In addition, a pouch-type secondary battery of the present invention may comprise an electrode assembly having a separator interposed between a positive electrode and a negative electrode and a case made of a laminate sheet, wherein the laminate sheet may comprise an outer resin layer, a metal barrier layer, and an inner resin layer, the inner resin layer comprising polypropylene or polyethylene, and a crosslinking agent.

Alternatively, a pouch-type secondary battery of the present invention may comprise an electrode assembly having a separator interposed between a positive electrode and a negative electrode; and a case made of a laminate sheet, wherein the laminate sheet may comprise an outer resin layer, a metal barrier layer, and an inner resin layer, the inner resin layer comprising a compound represented by the following Chemical Formula 1 or 2.

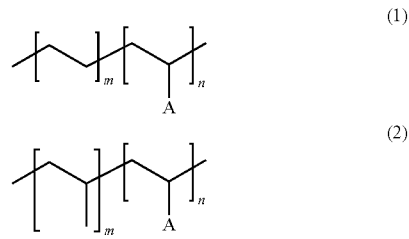

(In the above formulas, m and n are integers of 1 to 10, and A is a maleic acid group, an acrylic acid group or a carboxylic acid group.)

BEST MODE

Hereinafter, preferred embodiments of the present invention will be described in detail with reference to the accompanying drawings. In describing the principle of operation of the preferred embodiments of the present invention in detail, however, a detailed description of known functions and configurations incorporated herein will be omitted when the same may obscure the subject matter of the present invention.

A method of manufacturing the pouch-type secondary battery according to the present invention for achieving the above effect will be described with reference to FIGS. 2 to 4, and specific details thereof are as follows.

Figure 1:
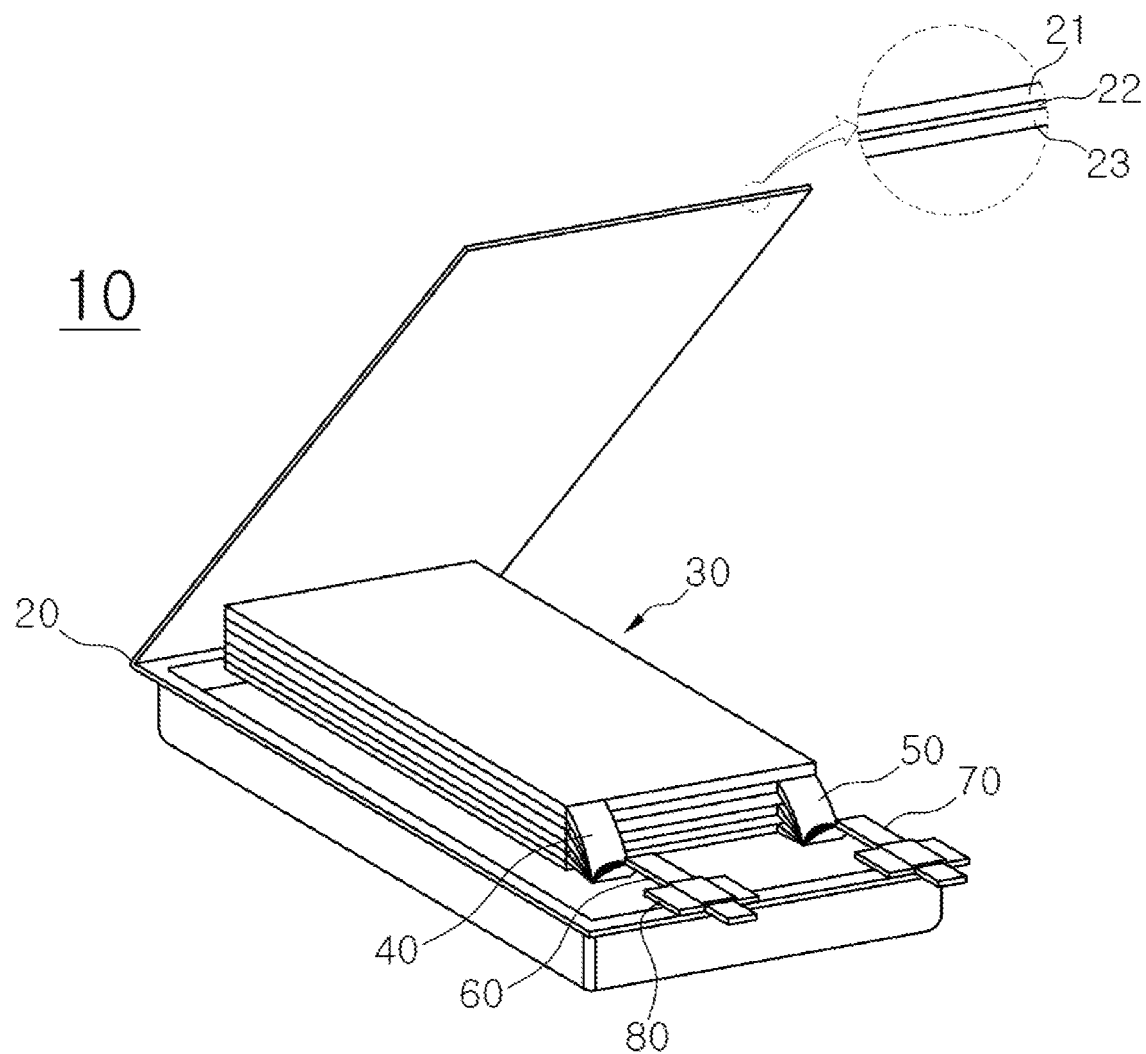
FIG. 1 is an exploded perspective view showing a conventional general pouch-type secondary battery.
Figure 2:
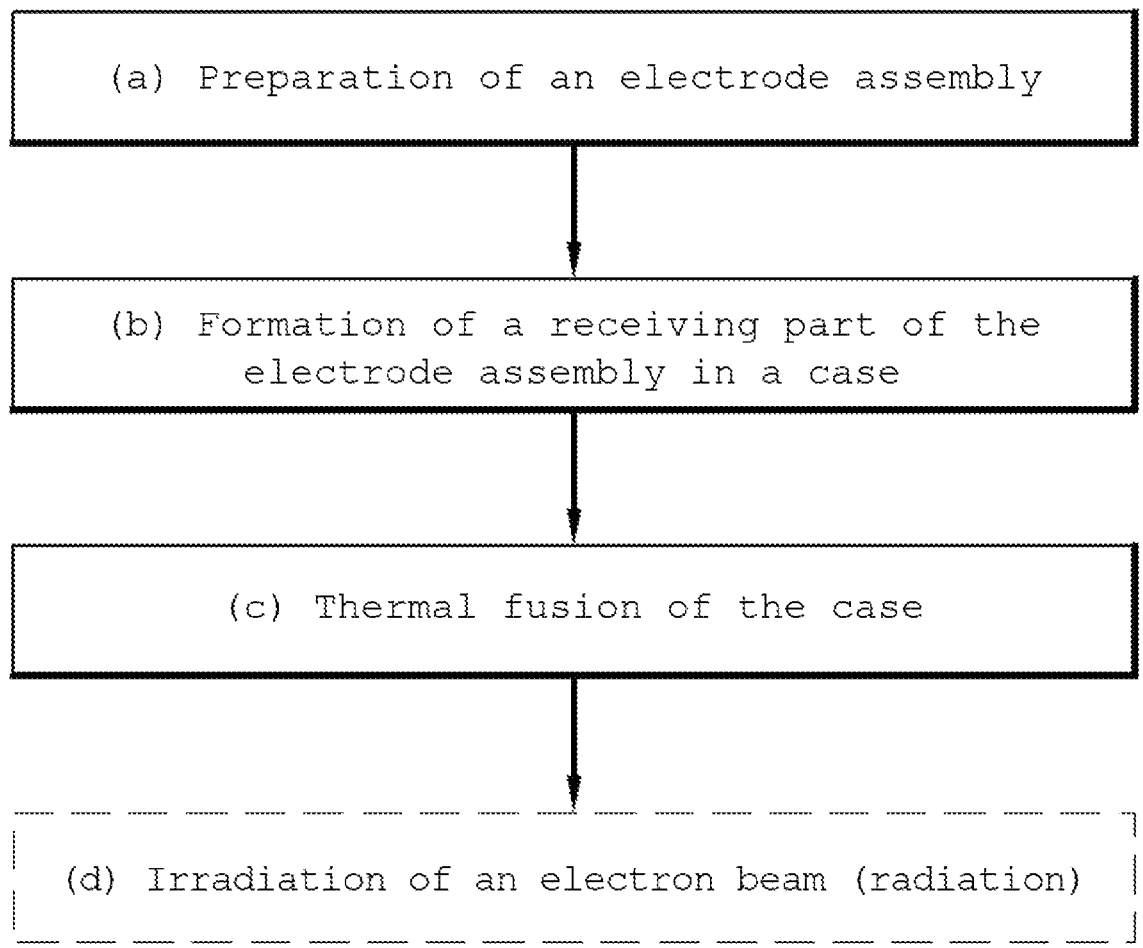
FIG. 2 is a manufacturing flowchart showing a pouch-type secondary battery of the present invention.

FIG. 2 is a manufacturing flowchart showing a pouch-type secondary battery of the present invention.

Referring to FIG. 2, the method of manufacturing a pouch-type secondary battery according to the present invention comprises: (a) preparing an electrode assembly having a separator interposed between a positive electrode and a negative electrode; (b) forming a receiving part for the electrode assembly in a case made of a laminate sheet; (c)

manufacturing a battery cell by receiving the electrode assembly in the receiving part and thermal fusion of the case; and selectively (d) irradiating an electron beam (E-beam) or radiation to the battery cell.

Particularly, in relation to the step (a) of preparing an electrode assembly having a separator interposed between the positive electrode and the negative electrode, a unit cell is manufactured such that a planar rectangular positive plate and a planar rectangular negative plate are laminated with a separator interposed therebetween so that the planar rectangular positive plate and the planar rectangular negative plate do not directly contact each other. A stacked type electrode assembly may be manufactured by stacking a plurality of unit cells. Alternatively, a laminated/stacked type electrode assembly may be manufactured by laminating the unit cell so that the positive electrode and the negative electrode are bonded to the separator and then stacking the plurality of unit cells in the height direction.

Alternatively, the unit cell may be spaced apart at predetermined intervals on a long separation sheet and then wound to manufacture a stacked/folded electrode assembly. Alternatively, a jelly-roll type electrode assembly may be manufactured by winding a separator between a long sheet type positive sheet and a long sheet type negative sheet with a separator interposed therebetween.

As described above, in the preparation of the electrode assembly, the electrode assembly may be prepared by stacking or winding the positive electrode, the negative electrode, and the separator constituting the electrode assembly in a predetermined order, or preparing a fully assembled electrode assembly itself.

The various types of electrode assemblies may selectively use only one type of electrode assembly, or may be used by mixing two or more types of electrode assemblies. When a plurality of the same or different types of electrode assemblies are included, there may be provided with different sizes of electrode assemblies.

In relation to the step (b) of forming a receiving part for the electrode assembly in a case made of a laminate sheet, the structure of the laminate sheet is described in detail as follows.

The laminate sheet may have a laminated structure comprising an outer resin layer, a metal barrier layer having air and moisture barrier properties, and an inner resin layer having thermal fusion property.

Figure 3:
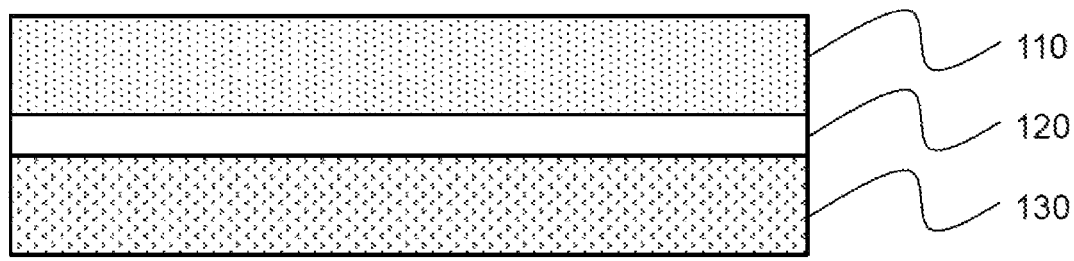
FIG. 3 is a vertical sectional view of a laminate sheet used in a case of the present invention.
Figure 4:
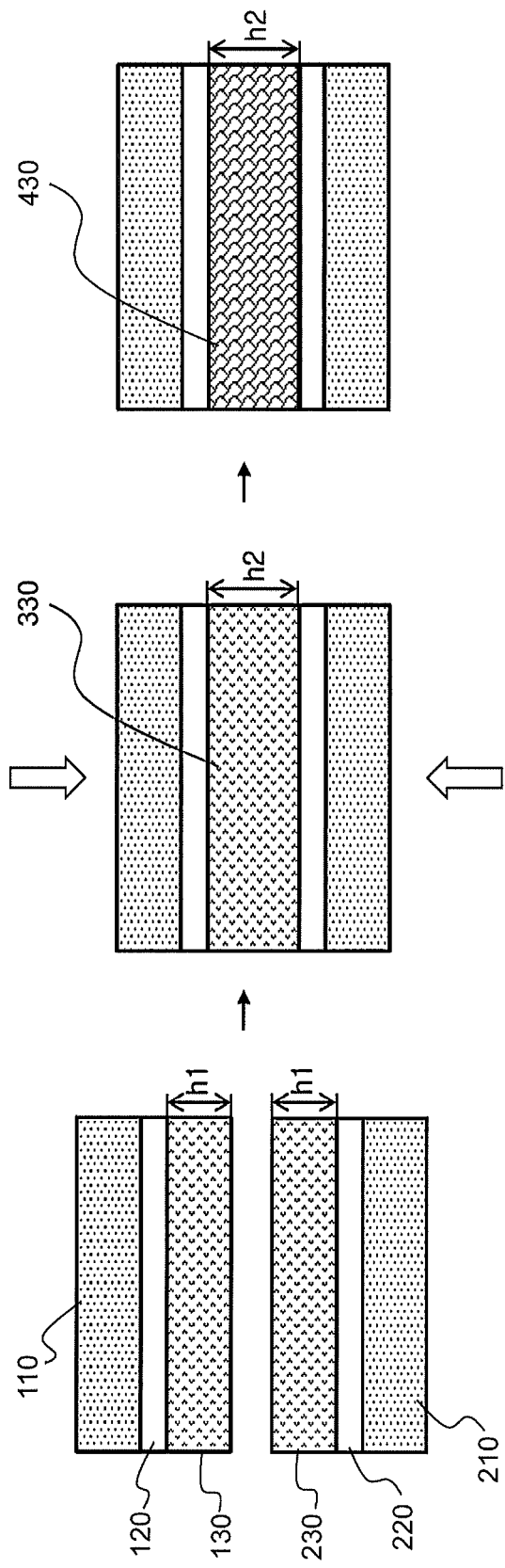
FIG. 4 is a vertical sectional view of a case of step (c) and step (d) during the manufacturing process of the pouch-type secondary battery of FIG. 2.

In this regards, FIG. 3 illustrates a vertical sectional view of a case of the present invention. Referring to FIG. 3, a case 100 of the present invention comprises an outer resin layer 110, a metal barrier layer 120, and an inner resin layer 130, from the outer side toward the inner side direction.

In the case 100 of FIG. 3, an adhesive layer (not shown) may be further interposed between the outer resin layer 110 and the metal barrier layer 120, and between the metal barrier layer 120 and the inner resin layer 130.

Since the outer resin layer should have excellent physical properties from the external environment as it serves to protect the battery cell from the outside, it requires excellent tensile strength and weather resistance compared to the thickness. For example, polyester resin such as polyethylene terephthalate (PET), polybutylene terephthalate (PBT), and polyethylenenaphthalate (PEN), polyvinyl chloride resin, polyvinylidene chloride resin or polystyrene resin such as polystyrene may be used. ONy (stretched nylon film) is used a lot. The above materials may be used individually or in mixture of two or more types.

The metal barrier layer may be aluminum (Al) or an aluminum alloy to exert a function of improving the strength of the case in addition to the function of preventing the inflow of foreign substances such as gas, moisture and the like or the leakage of the electrolyte. The aluminum alloy may include, for example, alloy numbers 8079, 1N30, 8021, 3003, 3004, 3005, 3104, 3105, and the like, which may be used alone or in combination of two or more.

The inner resin layer 130 comprises polypropylene or polyethylene, and a crosslinking agent, or comprises a compound represented by Chemical Formula 1 or 2.

In order to have a thermal fusion property (heat adhesiveness) to suppress the intrusion of the electrolyte, the inner resin layer may use polymer resin which has low hygroscopicity to the electrolyte and is not expanded or eroded by the electrolyte. For example, polyolefin resin such as polyethylene (PE) and polypropylene (PP) may be used as a base material.

In a concrete example, the inner resin layer may further comprise the crosslinking agent in addition to the base material as described above. The crosslinking agent may be at least one selected from a group consisting of trimethylolpropane triacrylate (TMPTA), triallyl isocyanurate (TAIL), and trimethallyl isocyanurate (TMAIC).

The crosslinking agent may be included in an amount of 2 wt % to 5 wt % of a total weight of a solid body in the inner resin layer.

In the case in which the crosslinking agent is less than 2 wt % of the total weight of the solid body of the inner resin layer, it is difficult to obtain the effect of increasing the strength by grafting polymerization. In the case in which the crosslinking agent is greater than 5 wt % of the total weight of the solid body of the inner resin layer, the inner resin layer may be hardened, and therefore there is a problem that it may not be used as a flexible case, which is not preferable.

In another concrete example, the inner resin layer may have a structure including a compound represented by the following Chemical Formula 1 or 2 instead of the base material as described above.

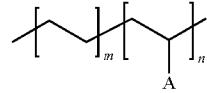
(1)

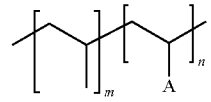
(2)

In the above Formulas, m and n are integers of 1 to 10, and A is a maleic acid group, an acrylic acid group or a carboxylic acid group.

In the conventional pouch-type secondary battery, when an excessive pressure is applied during the thermal fusion process of a case, a molten inner resin layer may be excessively compressed to form too thin, or partially exposed a metal barrier layer of a laminate sheet.

In addition, when the conventional pouch-type secondary battery is stored in a high temperature, the inner resin layer may collapse or cracks may occur, and there may be a problem with the insulation performance due to the occurrence of the cracks.

However, when using the present invention, the strength of the overall laminate sheet may be improved due to the inner resin layer comprising the crosslinking agent or the inner resin layer comprising the compound represented by Chemical Formula 1 or 2, and cracks may be prevented from occurring in the inner resin layer.

The inner resin layer of the laminate sheet may be a monolayer structure comprising polypropylene or polyethylene, and the crosslinking agent sensitive to the electron beam or radiation. Alternatively, the inner resin layer of the laminate sheet may be a monolayer structure comprising the compound represented by Chemical Formula 1 or 2. In other words, the case of the present invention may omit the adhesive layer added to increase the bonding force of the different materials in the conventional case of the pouch-type secondary battery, and the insulating layer added to provide insulation.

The method of forming the inner resin layer is not particularly restricted. For example, a method of melt extrusion of the mixture of the crosslinking agent in polypropylene or polyethylene used as the base material when manufacturing the inner resin layer, a method of melting extrusion of the compound represented by Chemical Formula 1 or 2, a method of spraying the mixture or the compound, or a method of forming a film from the mixture or the compound and the like may be used.

In general, a deep drawing method is used as a method of forming a receiving part of an electrode assembly in a case made of a laminate sheet. In particular, a method of forming a receiving part may be used by placing the laminate sheet on a die having a size corresponding to the size of the electrode assembly and pressing and stretching the laminate sheet by a punch.

In relation to the step (c) of manufacturing a battery cell by receiving the electrode assembly in the reception part and thermal fusion of the case, the electrode assembly is disposed inside the receiving part, so as to have the electrode tab and the electrode lead of the electrode assembly protrude to the outside of the case through the outer circumferential sealing part of the receiving part.

When the case includes an upper case and a lower case and each of the upper case and the lower case has a receiving part, the thermal fusion process may be performed in a state in which the electrode assembly is disposed on each of the upper case and the lower case.

In the thermal fusion process, after placing a portion to be formed the sealing part of the case on a sealing tool, the sealing part may be pressurized in a state in which the temperature of the sealing tool is increased to melt the inner resin layer, thereby primarily coupling the upper case and the lower case.

In relation to the step (d) of irradiating an electron beam (E-beam) or radiation to the battery cell, the crosslinking agent and the compound represented by Chemical Formula 1 or 2 are grafted polymerization by the electron beam or radiation, a graft polymerization reaction may be initiated through the step (d).

Here, alpha rays, gamma rays, X-rays and the like may be used as the radiation.

In a concrete example, the voltage range for the generation of the electron beam may be 0.2 MeV to 1 MeV, the wavelength range of the generated electron beam may be 0.005 nm to 0.1 nm, and the irradiation amount may be 10 kGy to 60 kGy.

The irradiation time of the electron beam may be set in consideration of the wavelength range of the electron beam and the size of the irradiation amount.

In a concrete example, the irradiation of the electron beam or radiation of step (d) may be applied to the sealing part of the battery cell.

In other words, considering that the effect of increasing the strength or creep property of the inner resin layer and improving the melting point may be achieved by the irradiation of the electron beam or radiation to the sealing part of the battery cell, the electron beam or radiation irradiation may be applied only to the sealing part of the battery cell. In such a case, this can be achieved by using a sealing tool including a function of irradiating electron beam or a radiation.

In another concrete example, the irradiation of the electron beam or radiation of step (d) may be provided to the entire area of the battery cell.

In other words, the inner resin layer comprising polypropylene or polyethylene, and the crosslinking agent, or the inner resin layer comprising the compound represented by Chemical Formula 1 or 2 may be formed on the entire area of the laminate sheet, and therefore, in the case of performing the step (d) to the entire area of the battery cell, the graft polymerization is performed in the entire inner resin layer including the sealing part.

In such a case, since the strength of the inner resin layer may be improved as a whole, cracks may be prevented from occurring in the entire area.

As described above, since the graft polymerization occurs by the compound included in the inner resin layer of the laminate sheet, the strength of the inner resin layer is improved due to the increase in the density of the inner resin layer.

In other words, since the occurrence of cracks in the inner resin layer may be prevented, the problem of deteriorating the insulation property may be solved, and the metal barrier layer may be prevented from being exposed to corrosion.

Regarding the steps (c) and (d), the steps (c) and (d) are described in more detail with reference to FIG. 4, which shows a vertical sectional view of a case of step (c) and step (d) during the manufacturing process of the pouch-type secondary battery of the present invention. The case has the upper case comprising the outer resin layer 110, the metal barrier layer 120, and the inner resin layer 130 from the outer side to the inner side direction; and the lower case, comprising an outer resin layer 210, a metal barrier layer 220, and an inner resin layer 230 from the outer side to the inner side direction. The case is sealed by thermocompression bonding by a sealing tool (not shown) which is pressed in the center direction at the outer surface of each of the upper case and the lower case.

Since the thickness h2 of an inner resin layer 330 after the thermocompression bonding is formed to be smaller than the sum of the thickness h1 of each of the inner resin layers 130 and 230 before the thermocompression bonding, the thickness of the inner resin layer becomes thin by thermocompression bonding. Thereafter, when the electron beam or the radiation is irradiated, the graft polymerization is performed by the crosslinking agent included in the inner resin layer 330, or the graft polymerization is performed by alteration or modification of the compound represented by Chemical Formula 1 or 2 as described above.

Since the graft polymerization process does not include a process of pressurizing but only includes the irradiation process of the electron beam or radiation in order to change the bonding state of the compound constituting the inner resin layer, the thickness h2 of an inner resin layer 430, in which the graft polymerization is performed, is equal to the thickness h2 of the inner resin layer 330 before the graft polymerization is performed.

However, as the density of the inner resin layer 330 becomes dense by the graft polymerization by irradiating the electron beam or radiation, the inner resin layer 430 having improved strength may be manufactured. Therefore, even if the secondary battery manufactured with the above-described case is deformed into a curved shape, cracks may be prevented from occurring.

In addition, since the inner resin layer deformed by the electron beam or radiation irradiation may increase the melting point, the risk of venting may be reduced even if the battery cell is stored in a high temperature, and thus high temperature storage property may be improved.

As described above, the present invention proposes a method of improving the strength of the inner resin layer, and thus, compared with the conventional pouch-type secondary battery, the present invention may maintain the sealing force and insulation property even if the thickness of the inner resin layer after the thermal fusion is formed relatively thin. Therefore, as the inner resin layer of the laminate sheet may be formed relatively thin to reduce the thickness of the overall battery case, the amount of inner resin layer constituent materials used to manufacture the case may be reduced, and productivity may be improved by shortening the coating time and drying time of the inner resin layer since the thickness of the inner resin layer becomes thinner.

On the other hand, the steps (c) and (d) are made sequentially. If the step (d) is performed before the step (c), the inner resin layer is hardened, and thus, even if the thermal fusion step of step (c) is performed, there may be a problem with the sealing force of the case. Therefore, it is preferable to proceed with the thermal fusion process of step (c) first to form a sealing part in the inner resin layer located in the sealing part of the case, and then to proceed with the step (d).

The present invention also provides a pouch-type secondary battery manufactured by the above described manufacturing method.

As described above, the pouch-type secondary battery manufactured by the above described manufacturing method is improved in strength due to an increase in the density of the inner resin layer, and therefore, the pouch-type secondary battery may ensure high insulation by preventing cracks from occurring, and may be stored at a high temperature as the melting point of the inner resin layer increases.

Hereinafter, the present invention will be described with reference to the following examples. These examples are provided only for easier understanding of the present invention and should not be construed as limiting the scope of the present invention.

Example 1

A resin composition was prepared by mixing 90 wt % of polypropylene, 8 wt % of polyvinylidene fluoride as a binder, and 2 wt % of trimethylolpropane triacrylate as a crosslinking agent.

The resin composition was applied onto a substrate using a comma coater and then dried to complete an inner resin layer.

The inner resin layer was attached to one surface of an aluminum thin film, and a nylon film layer was attached to the other surface as an outer resin layer to manufacture a case.

Example 2

A case was manufactured under the same conditions as in Example 1, except that polyvinylidene fluoride was changed to 5 wt % and trimethylolpropane triacrylate was changed to 5 wt %.

Comparative Example 1

A case was manufactured under the same conditions as in Example 1, except that 10 wt % of polyvinylidene fluoride was added without adding trimethylolpropane triacrylate.

Experimental Example 1

After applying the load of 4 kgf to the cases manufactured in Examples 1, 2 and Comparative Example 1 while maintaining the temperature of 60° C., creep tests were conducted to measure the time taken for the cases to break.

As a result of the creep tests, the time taken to deform the case of Example 1 with the addition of 2 wt % of the crosslinking agent was measured to 750 minutes, and the time taken to deform the case of Example 2 with the addition of the 5 wt % of the crosslinking agent was measured to 1,000 minutes.

On the other hand, the time taken to deform the case manufactured in Comparative Example 1 without the crosslinking agent was measured to 500 minutes.

As such, when the crosslinking agent is included, the time taken to break the case increases by 1.5 to 2 times, and thus, it can be confirmed that the creep performance of the sealing part of the case is improved.

Those skilled in the art to which the present invention pertains will appreciate that various applications and modifications are possible based on the above description, without departing from the scope of the present invention.

INDUSTRIAL APPLICABILITY

As described above, since a pouch-type secondary battery according to the present invention and a method of manufacturing the same comprise a material that is capable of increasing the rigidity of an inner resin layer inside a laminate sheet, the grafting polymerization of the material capable of increasing the rigidity contained in the inner resin layer is performed under a predetermined condition.

Therefore, the inner resin layer is deformed into a dense structure and the density thereof is increased, thereby improving the physical rigidity. As a result, it is possible to ensure high insulation by preventing cracks from occurring in the inner resin layer, and it is possible to manufacture a pouch-type secondary battery with improved high temperature storage property and sealing force due to the increase in the melting point of the inner resin layer.

DESCRIPTION OF REFERENCE NUMERALS

10: Pouch-type secondary battery
20, 100: Cases
21, 110, 210: Outer resin layers
22, 120, 220: Metal barrier layers
23, 130, 230, 330, 430: Inner resin layers
30: Electrode assembly
40, 50: Electrode tabs
60, 70: Electrode leads
80: Insulation film h1: Thickness of inner resin layer before thermocompression bonding h2: Thickness of inner resin layer after thermocompression bonding

The invention claimed is:

1. A method of manufacturing a pouch-type secondary battery, comprising the steps of:
   (a) preparing an electrode assembly having a separator interposed between a positive electrode and a negative electrode;
   (b) forming a receiving part for the electrode assembly in a case made of a laminate sheet; and
   (c) manufacturing a battery cell by receiving the electrode assembly in the receiving part and thermally fusing the case; and
   (d) irradiating an electron beam (E-beam) or radiation to the battery cell,
   wherein the laminate sheet comprises an outer resin layer, a metal barrier layer, and an inner resin layer, the inner resin layer comprising polypropylene or polyethylene, a binder, and a crosslinking agent,
   wherein an amount of the crosslinking agent is 2 wt % to 5 wt %,
   wherein the irradiation of the electron beam or radiation of the step (d) is provided to an entirety of the battery cell including a sealing part and the receiving part of the case, the receiving part containing the electrode assembly therein, such that graft polymerization is performed over an entirety of the inner resin layer extending over the sealing part and the receiving part,
   wherein an irradiation amount is in a range from 10 kGy to 60 kGy, and
   wherein the crosslinking agent is at least one selected from a group consisting of trimethylolpropane triacrylate (TMPTA), triallyl isocyanurate (TAIC), and trimethallyl isocyanurate (TMAIC).

2. A method of manufacturing a pouch-type secondary battery, comprising the steps of:
   (a) preparing an electrode assembly having a separator interposed between a positive electrode and a negative electrode;
   (b) forming a receiving part for the electrode assembly in a case formed of a laminate sheet; and
   (c) manufacturing a battery cell by receiving the electrode assembly in the receiving part and thermally fusing the case; and
   (d) irradiating an electron beam (E-beam) or radiation to the battery cell, wherein the irradiation of electron beam or radiation of the step (d) is provided to an entirety of the battery cell including a sealing part and the receiving part of the case, the receiving part containing the electrode assembly therein, such that graft polymerization is performed over an entirety of the inner resin layer extending over the sealing part and the receiving part,
   wherein the laminate sheet comprises an outer resin layer, a metal barrier layer, and an inner resin layer, the inner resin layer comprising a compound represented by Chemical Formula 1 or 2:
   wherein in the Chemical Formulas 1 or 2, m and n are integers of 1 to 10, and A is a

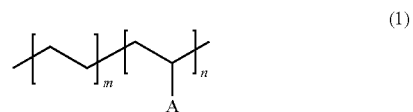

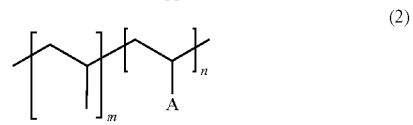

maleic acid group, an acrylic acid group or a carboxylic acid group, and
   wherein an irradiation amount is in a range from 10 kGy to 60 kGy.

3. The method according to claim 2, wherein the step (d) is performed after the step (c).

4. The method according to claim 3, wherein a sealing part is provided in the inner resin layer of an upper case and a lower case forming the case by thermal fusion of the step (c), and a graft polymerization is performed in the sealing part by irradiating the electron beam or radiation of the step (d).

5. The method according to claim 3, wherein the inner resin layer of the laminate sheet is a monolayer structure comprising polypropylene or polyethylene, and a crosslinking agent, wherein the crosslinking agent is sensitive to the electron beam or radiation.

6. The method according to claim 2, wherein the inner resin layer of the laminate sheet is a monolayer structure comprising a compound represented by the Chemical Formula 1 or 2.

7. The method according to claim 2, wherein the electrode assembly is at least one selected from a group consisting of a stacked type electrode assembly, a stacked/folded type electrode assembly, a laminated/stacked type electrode assembly, and a jelly-roll type electrode assembly.

8. A pouch-type secondary battery manufactured according to claim 2.

9. The method according to claim 1, wherein the step (d) is performed after the step (c).

10. The method according to claim 1, wherein the electrode assembly is at least one selected from a group consisting of a stacked type electrode assembly, a stacked/folded type electrode assembly, a laminated/stacked type electrode assembly, and a jelly-roll type electrode assembly.

* * * * *